US008396035B2

(12) United States Patent
van Rensburg et al.

(10) Patent No.: US 8,396,035 B2
(45) Date of Patent: Mar. 12, 2013

(54) SYSTEM AND METHOD FOR COMMUNICATIONS USING TIME-FREQUENCY SPACE ENABLED COORDINATED BEAM SWITCHING

(75) Inventors: Cornelius van Rensburg, Wylie, TX (US); Patrick Ahamad Hosein, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 422 days.

(21) Appl. No.: 12/761,250

(22) Filed: Apr. 15, 2010

(65) Prior Publication Data
US 2010/0272077 A1 Oct. 28, 2010

Related U.S. Application Data

(60) Provisional application No. 61/172,622, filed on Apr. 24, 2009.

(51) Int. Cl.
H04W 4/00 (2009.01)
(52) U.S. Cl. .................. 370/330; 370/437; 370/478
(58) Field of Classification Search .............. 370/310, 370/329, 330, 341, 437, 463, 478
See application file for complete search history.

(56) References Cited

U.S. PATENT DOCUMENTS

| 7,274,330 | B2 | 9/2007 | Lee |
| 7,274,936 | B2 | 9/2007 | Zangi et al. |
| 7,373,176 | B2 | 5/2008 | Chotkowski et al. |
| 8,041,313 | B2 | 10/2011 | Van Rensburg et al. |
| 2004/0224637 | A1 | 11/2004 | Silva et al. |
| 2005/0014540 | A1 | 1/2005 | Shim |
| 2005/0070331 | A1 | 3/2005 | Higuchi et al. |
| 2006/0203789 | A1 | 9/2006 | Iacono et al. |
| 2007/0097910 | A1* | 5/2007 | Ji et al. .................... 370/329 |
| 2008/0008110 | A1* | 1/2008 | Kishigami et al. ......... 370/310 |
| 2008/0020715 | A1 | 1/2008 | Zangi et al. |
| 2008/0075033 | A1 | 3/2008 | Shattil |
| 2009/0147869 | A1 | 6/2009 | Duan et al. |
| 2009/0253387 | A1 | 10/2009 | Van Rensburg et al. |
| 2009/0285169 | A1* | 11/2009 | Yang et al. ............... 370/329 |
| 2010/0080176 | A1* | 4/2010 | Maas et al. ............... 370/329 |

(Continued)

FOREIGN PATENT DOCUMENTS

| CN | 1551519 | 12/2004 |
| CN | 1672348 A | 9/2005 |

(Continued)

OTHER PUBLICATIONS

Baumgartner, T. et a., "Performance of Downlink Beam Switching for UMTS FDD in the Presence of Angular Spread," IEEE International Conference on Communications (ICC 2002), vol. 2, Aug. 2002, pp. 851-855.

(Continued)

*Primary Examiner* — Jeffrey M Rutkowski
(74) *Attorney, Agent, or Firm* — Slater & Matsil, L.L.P.

(57) ABSTRACT

A system and method for communications using time-frequency space enabled coordinated beam switching are provided. A method for transmitting information includes selecting a beam from a set of beams, determining a set of users out of a plurality of users, the set of users preferring the selected beam and for each user in the set of users, selecting a first available subframe-subband pair that maximizes the user's channel quality. The method also includes scheduling the selected subframe-subband pairs, and transmitting information related to the scheduled subframe-subband pairs to the users in the set of users.

17 Claims, 9 Drawing Sheets

U.S. PATENT DOCUMENTS

2010/0165926 A1* 7/2010 Fukuoka et al. ............ 370/329
2010/0195527 A1* 8/2010 Gorokhov et al. ........... 370/329
2010/0202308 A1* 8/2010 Gorokhov et al. ........... 370/329

FOREIGN PATENT DOCUMENTS

| CN | 101248594 A | 8/2008 |
|---|---|---|
| CN | 101272169 A | 9/2008 |
| CN | 121282151 A | 10/2008 |
| WO | WO2007/023515 | 3/2007 |

OTHER PUBLICATIONS

Liao, W.J., et al., "A Novel Beam Switching Antenna Using RF Switches," IEEE Antennas and Propagation Society International Symposium, IEEE, Honolulu, HI, Jun. 9-15, 2007, pp. 5865-5868.

Love, D.J., "On the Probability of Error of Antenna-Subset Selection with Space-Time Block Codes," IEEE Transactions on Communications, vol. 53, No. 11, Nov. 2005, pp. 1799-1803.

Pedersen, K., et al., "Application and Performance of Downlink Beamforming Techniques in UMTS," IEEE Communications Magazine, vol. 41, No. 10, IEEE Communications Society, Oct. 2003, pp. 134-143.

Sanayei, S., et al., "Antenna Selection in MIMO Systems," IEEE Communications Magazine, vol. 42, No. 10, IEEE Communications Society, Oct. 2004, pp. 68-73.

Zeng, X.N., et al., "Performance Bounds for Space-Time Block Codes with Antenna Selection," International Symposium on Information Theory, ISIT Proceedings, IEEE, Chicago, IL, Jun. 27-Jul. 2, 2004, p. 339.

European Search Report, Application No. 09815383.6-2411/2311192, Applicant: Huawei Technologies Co., Ltd., Jul. 20, 2011, 8 pages.

Nokia, "New UTRAN Measurement for RRM support of beamforming," 3GPP TSG RAN #21 meeting, Tdoc R1-01-0824, Aug. 27-31, 2001, 6 pages, Turin, Italy.

Thiele, L., et al., "Capacity Scaling of Multi-User MIMO with Limited Feedback in a Multi-Cell Environment," IEEE, 2007, 8 pages.

Written Opinion and International Search Report, International Application No. PCT/US09/57837, Applicant: Futurewei Technologies, Inc., Nov. 20, 2009, 6 pages.

Ericsson, "Schedule single vs. multiple beams per frame for E-UTRA," 3GPP TSG RAN WG1, Meeting #46, R1-062282, Aug. 28-Sep. 1, 2006, 5 pages, Tallin Estonia.

Ericsson, "LTE-Advanced—Coordinated Multipoint transmission/reception," TSG-RAN WG1 #53bis, R1-082469, Jun. 30-Jul. 4, 2008, 6 pages, Warsaw Poland.

Fujishima, K., et al., "Technical Proposal for IMT-Advanced," Hitachi, Rev-080009, 3GPP TSG RAN IMT-Advanced Workshop, Apr. 7-8, 2008, 23 pages, Shenzhen, China.

Hitachi, Ltd., "Interference management for broadband transmission with antenna port 5," 3GPP TSG RAN WG1 #55bis, R1-090068, Jan. 12-16, 2009, pp. 1-3, Ljubljana, Slovenia.

Hosein, P., et al., "On the Performance of Downlink Beamforming with Synchronized Beam Cycles," IEEE, 2009, 5 pages.

Huawei, "DL Coordinated Beam Switching for Interference management in LTE-Advanced," 3GPP TSG RAN WG1#54, R1-083236, Aug. 18-22, 2008, 6 pages, Jeju, Korea.

Samsung, "Inter-Cell Interference Mitigation Through Limited Coordination," 3GPP TSG RAN WG1, Meeting #54, R1-082886, Aug. 18-22, 2008, 8 pages, Jeju Korea.

Saur, S., et al., "Grid-of-Beams (GoB) Based Downlink Multi-User MIMO," IEEE 802.16 Broadband Wireless Access Working Group, May 5, 2008, pp. 1-4.

NTT Docomo, Inc., "Proposals for LTE-Advanced Technologies," 3GPP TSG RAN WG1, Meeting #53bis, R1-0825, Jun. 30-Jul. 4, 2008, 36 pages, Warsaw Poland.

International Search Report and Written Opinion of the Patent Cooperation Treaty received in International Application No. PCT/CN2010/072175, mailed Jul. 15, 2010, 12 pages.

* cited by examiner

```
determine frequency of each beam in the cycle;
loop over beams
    reset counter;
    while (counter < NumThisBeam)
        loop over MS with this beam
            choose max SB for this MS;
            done = FALSE;
            loop over timeslots
                if this timeslot is free
                    assign beam to SB;
                    increment counter;
                    done = TRUE;
                    break out of timeslot loop;
                end if
            end timeslot loop
            if (done == FALSE)
                remove SB for this MS in future comparisons;
            end if
            if (counter==NumThisBeam)
                break out of MS loop;
            end if
        end MS loop
    end while
end beam loop
```

*Fig. 5* b(i) = best beam for MS i;
SINR of MS i in subband s, frame t;
NumAlloc (b) = num of times beam b has been allocated;
MSs_per_Beam (b) = num of MSs within beam b;
B(s,t) = beam used in subband s, frame t;
Done = 0;
while (NOT Done)
    b* = arg_over(beam_index b)_max{MSs_per_Beam/NumAlloc};
    Increment NumAlloc(b*);
    MSs = The MSs that prefer beam(b*);
    s* = arg_over(subband s)_max(sum(SINR(MSs)));
    Assign beam(b*) to SubBand(s*);
    Remove SubBand(s*) for MSs from future selections. Set SINR(MSs,s*) = 0;
    If all SubBands are assigned, Set Done=1;
end
For each s,t schedule MSs within B(s,t)

*Fig. 7*

SYSTEM AND METHOD FOR COMMUNICATIONS USING TIME-FREQUENCY SPACE ENABLED COORDINATED BEAM SWITCHING

This application claims the benefit of U.S. Provisional Application No. 61/172,622, filed on Apr. 24, 2009, entitled "System and Method for Allocating Beams in Time-Frequency Space Enabled Coordinate Beam Switching in a Wireless Communications System," which application is hereby incorporated herein by reference.

TECHNICAL FIELD

The present invention relates generally to wireless communications, and more particularly to a system and method for communications using time-frequency space enabled coordinated beam switching.

BACKGROUND

During the development of the Third Generation Partnership Project (3GPP) Long Term Evolution (LTE) technical standards, there was much discussion for the flexibility to customize LTE to maximize performance in specific environments. Also, during discussions of the 3GPP LTE-Advanced (LTE-A) technical standards, many suggestions were made to manage interference level by using coordinated transmissions from different cells. It is well known that as cell size is decreased in an effort to improve spectral efficiency, interference increases.

In general, communications systems using beamforming make use of a number of transmit and/or receive antennas and signal processing to create fixed or adaptive transmit/receive beampatterns. The beampatterns may have a directional nature that may result in a performance improvement when compared with unidirectional transmit and/or receive antennas. The use of the beampatterns may yield a transmit/receive gain over communications systems using unidirectional transmit and/or receive antennas.

As such, beamforming has been promoted as a promising technique to increase cell coverage and to improve cell edge spectral efficiencies. However, a drawback of beamforming is the so called flashlight effect where the channel quality changes between mobile station (MS) measurement and base station (BS) transmission, due to the changes in the beampattern of the interfering neighbouring cells. Coordinated beamforming/switching has been suggested as a possible solution to this problem.

SUMMARY

These and other problems are generally solved or circumvented, and technical advantages are generally achieved, by embodiments of a system and method for communications using time-frequency space enabled coordinated beam switching.

In accordance with an embodiment, a method for transmitting information is provided. The method includes selecting a beam from a set of beams, determining a set of users out of a plurality of users, the set of users preferring the selected beam, and for each user in the set of users, selecting a first available subframe-subband pair that maximizes the user's channel quality. The method also includes scheduling the selected subframe-subband pairs, and transmitting information related to the scheduled subframe-subband pairs to the users in the set of users.

In accordance with another embodiment, a method for transmitting information is provided. The method includes selecting a beam from a set of beams that maximizes a ratio of users per beam to allocated users, computing a measure of channel quality for each subframe-subband pair in a set of subframe-subband pairs of the selected beam for all users that prefer the selected beam, and selecting a subframe-subband pair in the set of subframe-subband pairs with a largest measure of channel quality. The method also includes allocating the selected subframe-subband pair to the selected beam, scheduling the allocated subframe-subband pairs, and transmitting information related to the scheduled subframe-subband pairs.

In accordance with another embodiment, a controller is provided. The controller includes a receiver coupled to an antenna, a transmitter coupled to the antenna, a controller coupled to the receiver and to the transmitter, and a scheduler coupled to the receiver and to the controller. The receiver receives signals detected by the antenna, and the transmitter transmits signals using the antenna. The controller computes a measure of a quality of a channel between the controller and a communications device, and the scheduler selects a beam out of a set of beams based on preferred beam information provided by communications devices served by the controller, selects an available time-frequency resource for each communications device preferring the selected beam, and schedules a transmission opportunity for the communications devices based on the selected available time-frequency resources.

An advantage of an embodiment is that the ability to allocate both time and frequency resources of beams may allow for greater resource allocation granularity, which may enable greater spectral efficiency.

A further advantage of an embodiment is that the allocation of both time and frequency resources may reduce beam cycle pattern cycle times, thereby reducing an impact of dead beams. Furthermore, the reduced beam cycle pattern cycle times may reduce latency since resource may become available with greater frequency.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 5 is a diagram of a pseudo-code representation of the time-frequency domain beam scheduling and sorting;

FIG. 7 is a diagram of a pseudo-code representation of the time-frequency domain beam scheduling and sorting;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a 3GPP LTE compliant communications system supporting coordinated beam switching. The invention may also be applied, however, to communications systems compliant to other technical standards, such as 3GPP LTE-Advanced, WiMAX, and so forth.

Figure 1A:
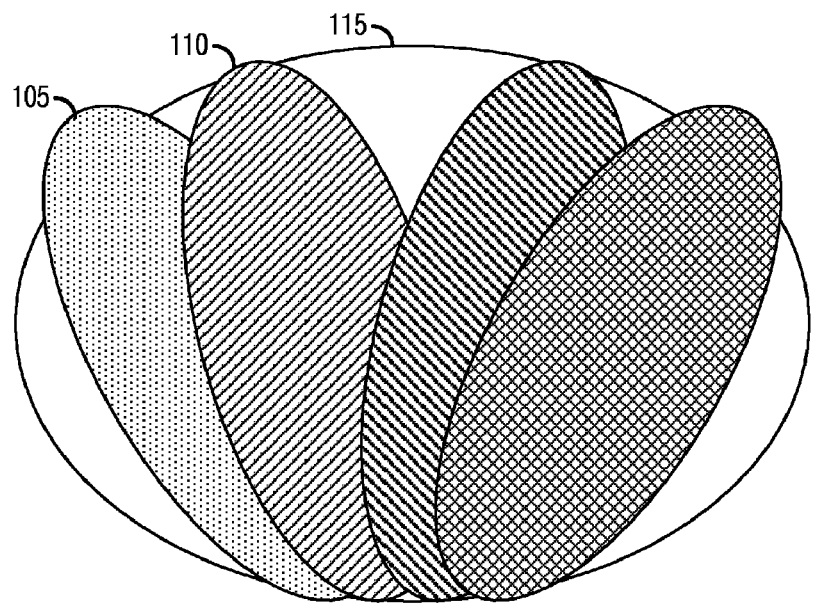
FIG. 1a is a diagram of possible antenna beams from a plurality of antennas.
Figure 1B:
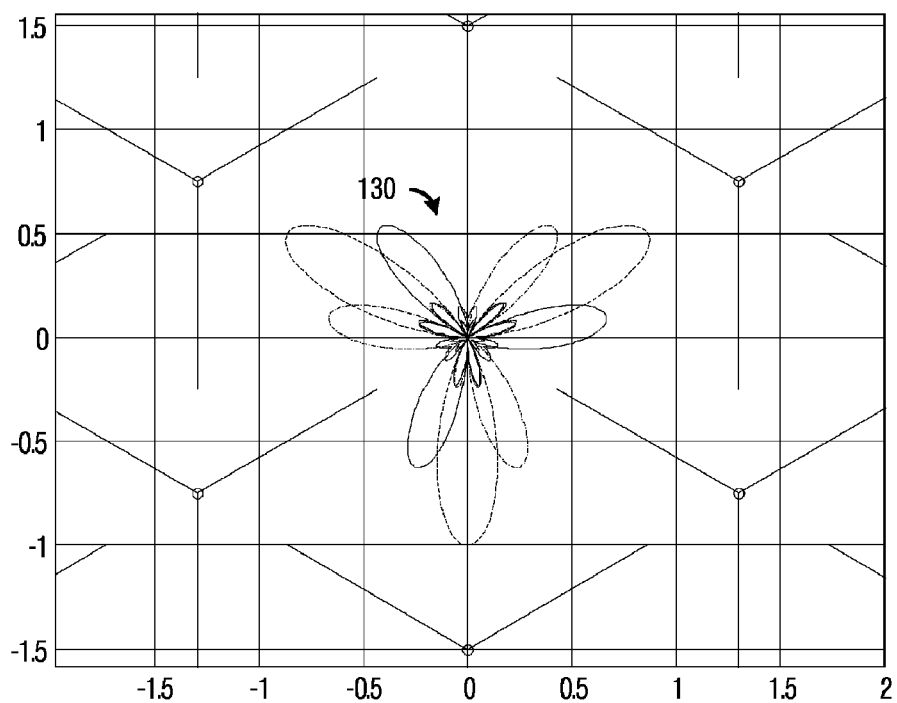
FIG. 1b is a diagram of a typical three-sector cellular communications system layout with directional beam patterns at a center cell.

FIG. 1a illustrates possible antenna beams from a plurality of antennas. As shown in FIG. 1a, there are four directional antenna beams, such as directional antenna beam 105 and directional antenna beam 110, corresponding to different transmission antennas. FIG. 1a also illustrates an omnidirectional beam 115 that may correspond to the use of all antennas in the plurality of antennas to transmit the signal to be transmitted. FIG. 1b illustrates a typical three-sector cellular communications system layout with directional beam patterns at a center cell 130.

Figure 1C:
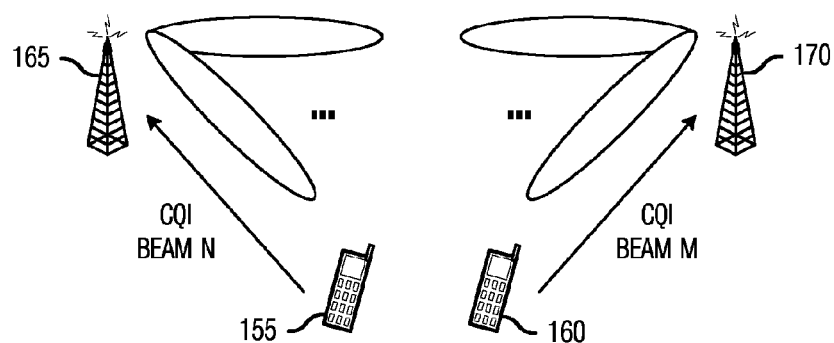
FIG. 1c is a diagram of the operation of two MSs in two adjacent cells.

FIG. 1c illustrates the operation of two MSs in two adjacent cells. A first MS "MS1" 155 may measure transmissions from a first BS "BS1" 165 and a second MS "MS2" 160 may measure transmissions from a second BS "BS2" 170 to determine a best channel quality indicator (CQI), which it may report back to its respective BS. The transmissions made by the BSs may be made with different antenna beams at different times. Then, transmissions to the MSs may be made using the slot corresponding to the best CQI reported to the BSs by the MSs.

Cell coordination may occur at many levels. At a highest level, a central scheduler has full knowledge of all radio conditions of all MSs in a cluster of cells and tries to find a global optimum selection of MSs to be served at any instant in time. The use of a central scheduler would unfortunately require an excessive overhead on the backhaul, and may be simply impossible to implement if the fundamental delays on the backhaul transmission are considered. Therefore a simpler, less optimal solution that would be easier to implement may be needed.

The embodiments discussed herein make use of a new beamforming mode, referred to as coordinated beam switching mode. In coordinated beam switching, every participating BS may determine its own cycling pattern, based on a predefined pattern and based on its load and MS distribution and then communicate this cycling pattern over a backhaul to other BSs in the cluster. The cycling pattern does not need to be communicated to the MSs, only the cycling pattern's period. The coordinated beam switching mode implies that:

The reference signal (RS) on Antenna port 5 is always switched on.

A MS measures CQI based on Antenna port 5.

The BSs in a cluster taking part in the coordination agree and broadcast the period of the beam cycling pattern. For example, a BS with eight (8) antennas may choose a period of eight (8), while a BS with four (4) antennas may select a period of four (4). The cluster period will be determined either by a cluster controller or some function of the reported cell periods, such as greatest reported period, namely eight (8).

A cluster controller determines, based on the reported cycling periods, an optimum cycling period and reports this period back to the individual BSs. The BSs may then have to adjust their preferred cycling period to the cluster controller period and broadcast the cycling period to the MSs in the cells.

In another embodiment, the period is determined by a technical standard or is otherwise pre-specified and each BS determines its beam cycling pattern accordingly, and the period does not need to be broadcasted since the MSs will already know the period from the technical standard or from the pre-specified value.

The MS reports the subframe where the maximum CQI was measured in the period, and reports one CQI per period.

According to the LTE technical standards, antenna port five (5) is configured as a MS specific RS which is only switched on during data transmission on the physical downlink shared channel (PDSCH). The embodiments have a mode wherein antenna port five (5) is configured as a cell specific RS which is permanently switched on during this mode. The use of antenna port five (5) as a common RS is such that if all BSs in a cluster cycled through a set of predefined beams over a specific period of a certain number of subframes where both the RS and PDSCH use the same beams. Resulting in both a predictable beam and interference to a MS. Given that the MS will then measure the CQI directly from the cell specific RS on antenna port five (5), there may be no ambiguity about the CQI as is currently the case with the MS specific RS.

Considering that antenna port five (5) will be activated primarily in correlated fading environments, it is expected that some beams will lead to much better CQI reports than others. In order to reduce the CQI feedback overhead and to avoid feeding back bad CQI's, it is proposed that only good (or only the best) CQI be fedback within a certain period, which will be a fixed (or slowly varying) value within a cluster of cells.

Advantages of the embodiments include:

The MS does not need to perform a channel estimate on an interfering cell.

The MS does not need to report a preferred PMI nor a preferred interferer PMI.

The CQI calculated is a function of the complete interference environment, not only based on the strongest interferer.

The MS does not need to know the configuration of the other BSs in the cluster. For example some BSs could have different numbers of antennas, and different configurations. Some BSs may not even participate in the coordination and the MS does not need to know that. If a neighboring BS has an uncorrelated antenna configuration, and does not operate in the coordinate beam switching mode (it may perform spatial multiplexing or transmit diversity), then the CQI will be a function of the data transmitted in the REs where the antenna port 5 RS would normally be.

In order to efficiently implement a coordinated beam switching system, a time-frequency beam allocation method may be used. LTE has an orthogonal frequency division multiple access (OFDMA) signal structure on the downlink, which means that there is a frequency domain component that may be exploited. Given that the current LTE reference may be able to do frequency domain subband scheduling (in addition to time domain subframe scheduling), and therefore obtain multi-user diversity gains on a subband level, similar gains need to be achieved with coordinated beam switching.

Furthermore, as discussed previously, the importance of selecting the shortest possible cycle length in order to reduce the scheduling delay must be stressed. Given that in OFDMA, it is possible to cycle in both time and frequency, there is more flexibility to choose longer cycle lengths (which are shorter in time) which may more accurately reflect the per beam loading, as well as provide the necessary interference diversity. For example, in a beam cycle pattern with a period of 10 time slots, with just time domain cycling, a period of the beam cycle pattern is 10 time slots. However, with time domain and frequency domain cycling, a period of the beam cycle pattern may be L time slots, where L=10/# frequency bands per time slot. So, for a communications system with five frequency bands per time slot, the period of the beam cycle pattern is only 10/5=2 time slots. The shorter period may reduce latency while providing additional scheduling granularity or flexibility.

Additionally, a specific beam should be placed on a subband where the corresponding MSs have a frequency domain peak. Given a large MS pool, the placement of the specific beam on the subband is not crucial since in general, some MS will always be at a peak at every subband. However, in a low loading situation, beam placement may be more important.

Figure 2:
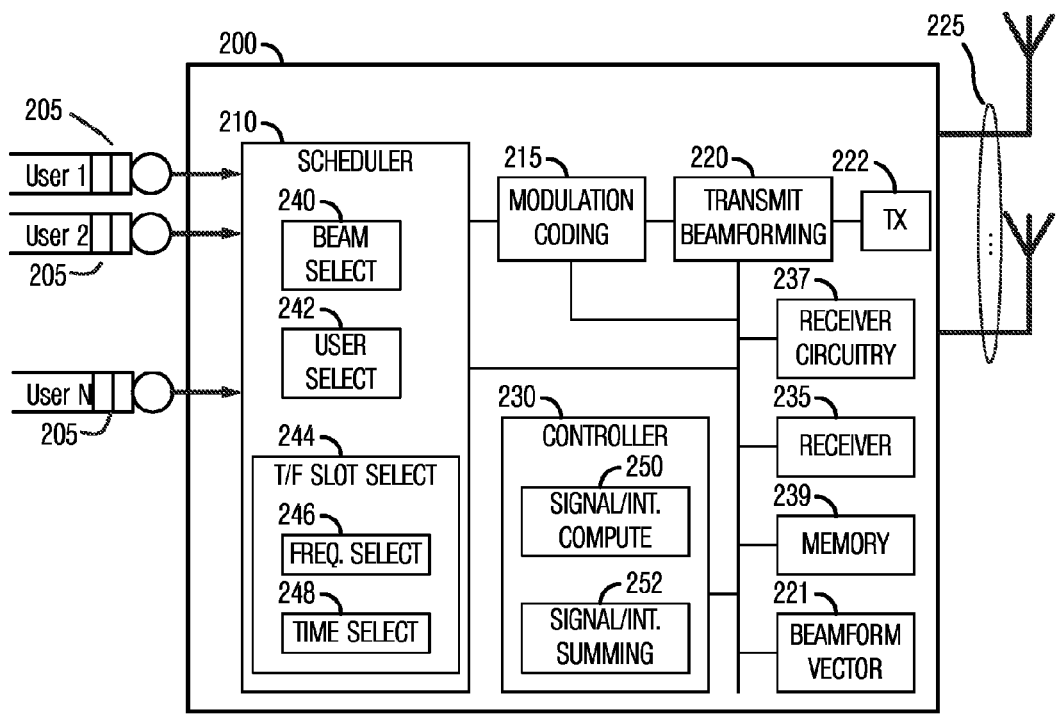
FIG. 2 is a diagram of a BS.

FIG. 2 illustrates a BS 200. Data 205 destined for a plurality of MSs being served by BS 200, in the form of bits, symbols, or packets, for example, may be sent to a scheduler 210, which may decide which UEs will transmit or receive in a given time/frequency opportunity. Scheduler 210 may use any of a wide range of known scheduling disciplines in the literature including round robin, maximum sum rate, proportional fair, minimum remaining processing time, or maximum weighted sum rate. Generally scheduling decisions are based on channel quality information feedback (in the form of channel quality indicators or other short term information, for example) fedback from a plurality of MSs.

Data from MSs selected for transmission may be processed by a modulation and coding unit 215 to convert the data to transmitted symbols. Modulation and coding unit 215 may also add redundancy for the purpose of assisting with error correction and/or error detection. A modulation and coding scheme implemented in modulation and coding unit 215 may be chosen based in part on information about the channel quality information feedback (in the form of channel quality indicators or other short term information).

The output of modulation and coding unit 215 may be passed to a transmit beamforming unit 220, which maps the output (a modulated and coded stream for each MS) onto a beamforming vector. Beamforming vectors may be provided by a beamforming vector compute unit 221. A controller 230 coupled to modulation and coding unit 215, transmit beamforming unit 220, and beamforming vector compute unit 221, may provide signaling for the control of the transmission of transmissions to the MSs.

The beamformed outputs may be coupled to antennas 225 through RF circuitry, such as a transmitter (TX) 222. Although shown in FIG. 2 as having only two antennas, it should be understood that BS 200 may have any number of antennas, such as one, two, three, four, and so forth, antennas.

Beamforming vector compute unit 221 produces beamforming vectors from the channel information feedback, from sounding signals received from the MSs, and/or from beam information provided by scheduler 210. For example, in time division duplexed (TDD) communications systems, channel reciprocity may be utilized to compute beamforming vectors based on sounding signals transmitted by MSs. While, in frequency division duplexed (FDD) communications systems, where channel reciprocity may not be utilized, and in communications systems not using channel reciprocity, channel information feedback from the MSs may be used to compute beamforming vectors. Beam information, such as beam cycle pattern, and so forth, may also be used to compute beamforming vectors.

A receiver 235 may receive signals detected by antennas 225 and receiver circuitry 237 may perform analog and/or digital signal processing on the received signals. Operations performed by receiver circuitry 237 may include filtering, amplification, decoding, demodulation, de-interleaving, and so on. Furthermore, receiver circuitry 237 may include feedback information circuitry responsible for processing channel information provided by MSs served by BS 200. The channel information processed by receiver circuitry 237 to generate beamforming vectors, beam selection, user selection, and so forth, to improve an overall performance of BS 200 as well as MSs served by BS 200.

In addition to channel information, the MSs served by BS 200 may also provide information regarding a preferred beam out of a set of beams transmitted by BS 200. A MS may select its preferred beam from the set of beams based on channel measurements made by the MS. A MS' preferred beam may be dependent on factors such as a location of the MS in a service area of BS 200, distance (separation) from BS 200, and so forth.

Channel information, along with preferred beam information may be used by scheduler 210 to select time-frequency resources to allocate to the MSs. Scheduler 210 includes a beam select unit 240 that may be used to select a beam from the set of beams making up the beam cycle pattern of BS 200. Beam select unit 240 may select a beam based on factors such as a number of MSs reporting a beam as a preferred beam. For example, a beam that has been selected by more MSs may be selected before a beam that has been selected by only a small number of MSs.

Scheduler 210 also includes user select unit 242 that may be used to select a MS that has reported the selected beam as its preferred beam. User select unit 242 may select a MS based on a number of factors, including: MS priority, allocation history for the MS, data/connection priority, time since last previous selection of the MS, quality of service requirements, signal strength, amount of data to transmit, available resources, and so on.

Scheduler 210 also includes a time-frequency resource select unit 244. Time-frequency resource select unit 244 may select a time resource and a frequency resource within a selected beam. The frequency resource may be selected by a frequency select unit 246, while the time resource may be selected by a time select unit 248. Frequency select unit 246 may select a frequency range for the MS that best suits the MS, for example, a frequency range that maximizes the MS' signal and interference to noise ratio.

In addition to controlling the operations involved in transmitting data to MSs, controller 230 may be used to compute measures of signal quality for MSs based on time-frequency resources assigned to the MSs. Controller 230 includes a signal and interference compute unit 250 that may be used to compute a measure of signal quality, such as signal to noise ratio or signal plus interference to noise ratio. Controller 230 also includes a signal and interference summing unit 252 that may be used to aggregate a variety of measures of signal quality for the MSs into a single measure of signal quality. Signal and interference summing unit 252 may produce a summation of measures of signal quality as reported by the MSs for a specified frequency band, such as a single allocatable frequency band.

A detailed description of the operations of BS 200 is provided below.

Figure 3:
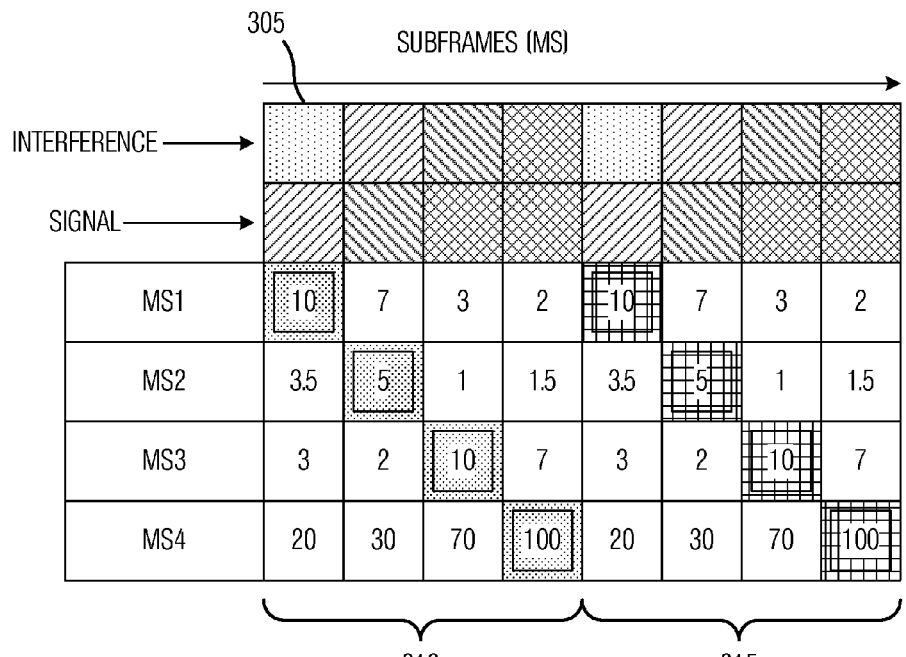
FIG. 3 is a diagram of CQI as reported by MSs.

FIG. 3 illustrates CQI as reported by MSs. FIG. 3 also illustrates scheduling of subframes in the time domain. CQI, as reported by a number of MSs, is shown for different subframes. For example, at subframe 305, MS1 reported CQI of 10, while MS2 reported CQI of 3.5, MS3 reported CQI of 3, and MS4 reported CQI of 20. A maximum CQI for each MS is shown highlighted in shaded boxes with smaller sub-squares, with a maximum CQI for MS1, MS2, MS3, and MS4, being 10, 5, 10, and 100, respectively. Spans 310 and 315 highlight two beam cycles. Notice that subframes that yielded maximum CQI for each of the MSs in span 310 also produce maximum CQI for each of the MSs in span 315.

With coordinated beam switching, it may be possible to modify the purely time frequency domain scheduling shown in FIG. 3 into a time-frequency domain based scheduling by adding frequency domain based scheduling to the time domain based scheduling.

Figure 4A:
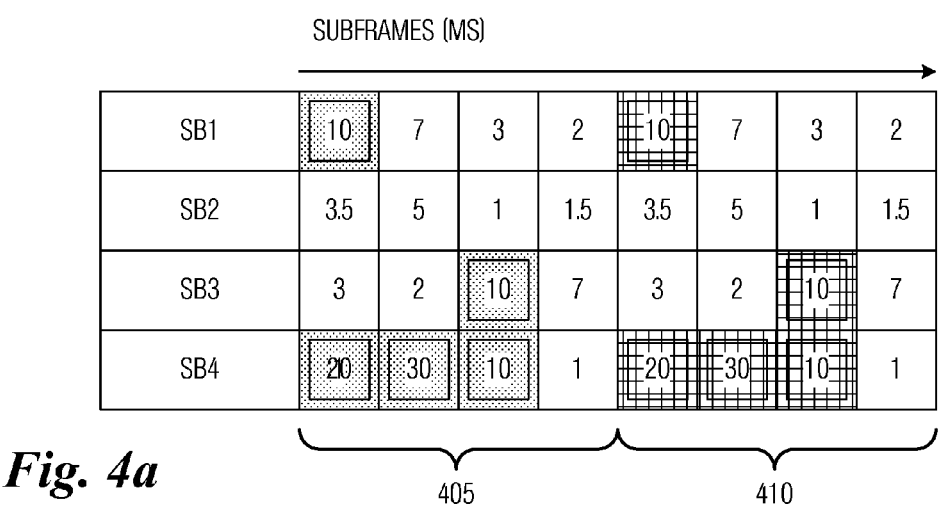
FIG. 4a is a diagram of CQI per subband as reported by MSs for two subframe cycles.
Figure 4B:
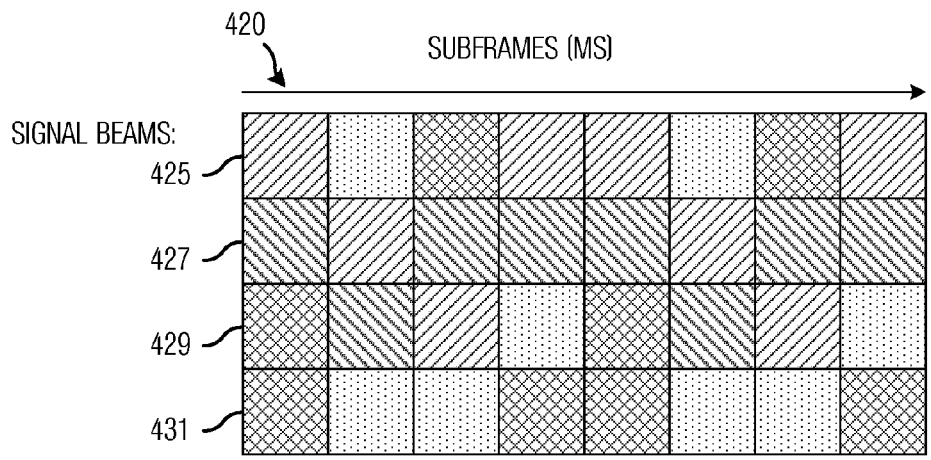
FIG. 4b is a diagram of subband availability within a subframe.
Figure 4C:
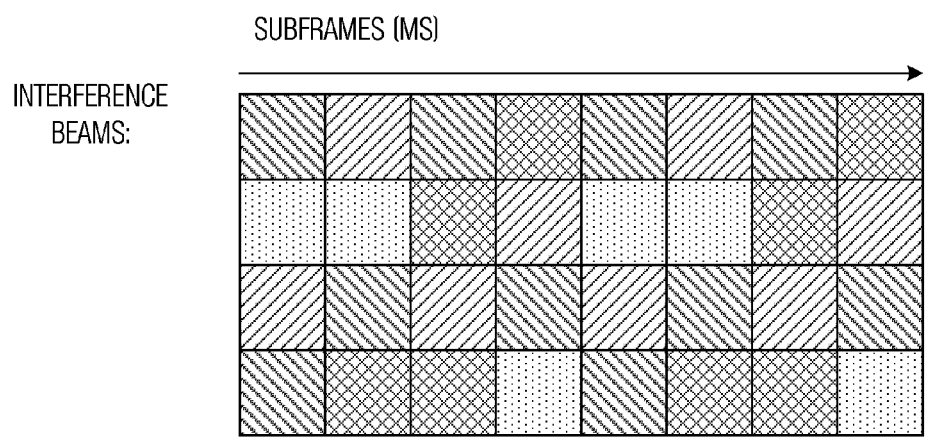
FIG. 4c is a diagram of subband interference within a subframe.

FIG. 4a illustrates CQI per subband as reported by MSs for two subframe cycles (shown as span 405 and span 410). Within each subframe cycle, the five highest reported CQI for all MSs are highlighted, wherein in span 405, the five highest reported CQI are highlighted with shaded squares and in span 410, the five highest reported CQI are highlighted with cross-hatched squares. FIGS. 4b and 4c illustrate diagrams of subbands available within each subframe, with FIG. 4b showing subband allocation of a signal beam and FIG. 4c showing subband allocation of interference beams. For example, FIG. 4b shows that there are four subbands per subframe and for subframe 420, subband 425 may be allocated to one MS, subband 427 may be allocated to another MS, while subbands 429 and 431 may be allocated to yet another MS.

An aim of a coordinated beam switching system is to make the interference pattern cyclical and therefore predictable. This means that once a BS has decided which beams to use in a beam cycle, it should not change this decision easily and has to maintain the beam cycle for at least a long time (on the order of a few seconds). A problem associated with making a bad beam selection, is that a MS may not select that bad beam in the future thus resulting in a "dead" beam, that is a beam that a part of the beam cycle, but no MSs reporting a CQI for that timeslot, thus resulting in a wasted timeslot.

Therefore careful consideration should be given to the beam selection process. For the case of a single band, it was shown that, in order to achieve proportionally fair rates for the MSs, the rate at which a particular beam is chosen should be made proportional to the number of MSs that lie within the beam. For example, if there are 10 MSs and nine MSs lie within beam one (1) while one MS lies within beam two (2) then beam one should be scheduled nine times more often than beam two.

The same holds true for multiple subbands with the only difference being that the granularity in which beams are chosen is now increased since in a single frame, each subband may be assigned a different beam. Therefore as long as beams are allocated proportional to the number of MSs within the beam then cross-beam fairness may still be maintained.

Once a beam is chosen, a scheduler may be responsible for choosing the MSs to be served within the beam and hence is responsible for maintaining fairness among MSs in the same beam. Therefore, by maintaining cross-beam fairness (through beam allocations) and intra-beam fairness (through the scheduler) then fairness among all MSs may be obtained.

With multiple subbands, there are two degrees of freedom (time and frequency) that can be used to achieve MS diversity gains. Recall that, each MS reports signal plus interference to noise ratio (SINR) values for its best beam (or a number of the largest ones) for each subframe-subband pair within a cycle period. Therefore, once a beam is selected for allocation, the MS SINR information may be used to determine in which subframe-subband pair the MS should be scheduled to.

In order to achieve diversity gains, a decision regarding subframe-subband pair scheduling may be made as follows: For each beam allocation, find the MSs that selected that beam; then, cycle through those MSs, and for each MS, select a first available subframe-subband pair that would maximize that MS' SINR. The process continues for all remaining MSs that selected the beam until the required number of assignments of the beam has been met, as previously determined by a beam selector. Once the beam has been assigned the required number of times, the process continues with the next beam and so forth, until all beams have been assigned and there are no more empty subframe-subband pairs. The individual MS assignments are then made by the scheduler. FIG. 5 illustrates a pseudo-code representation of the time-frequency domain beam scheduling and sorting.

Figure 6:
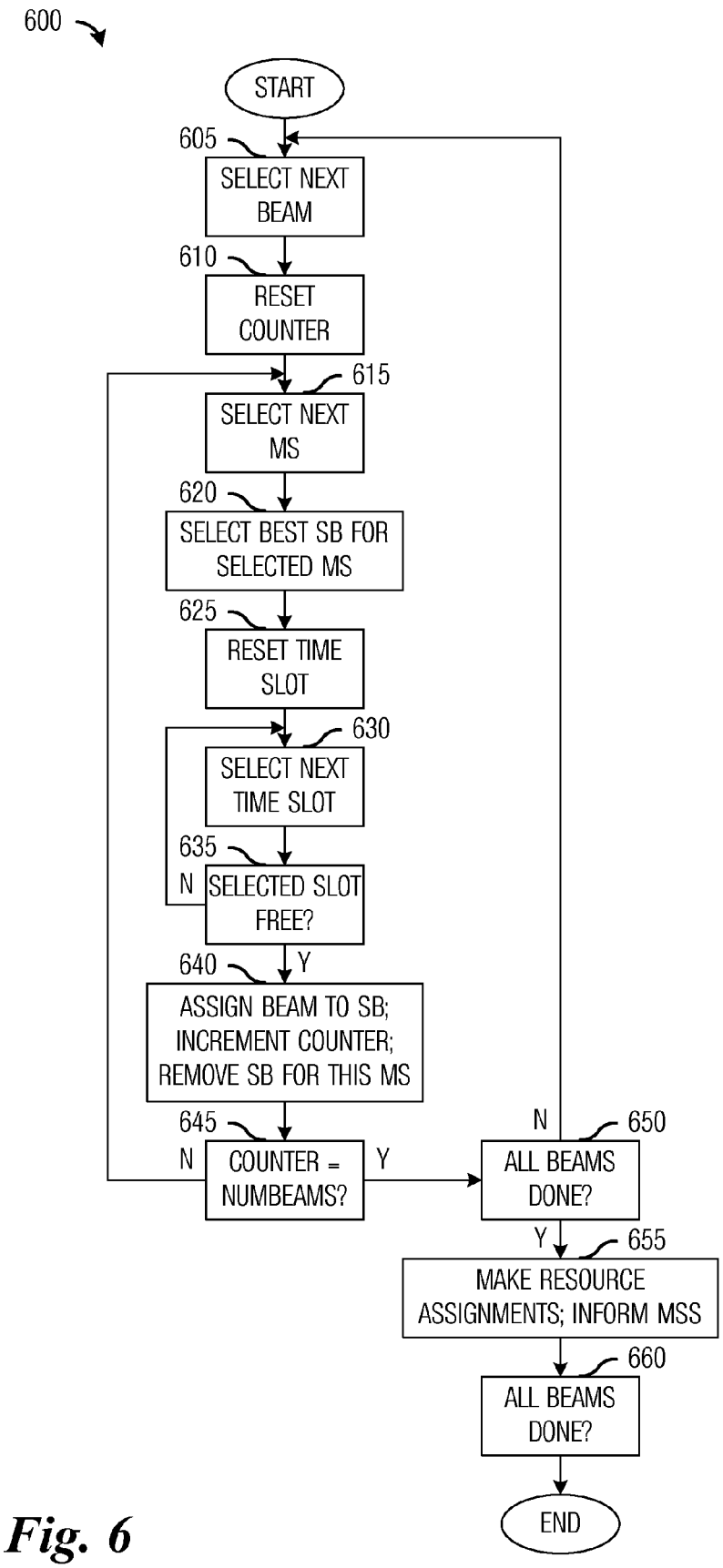
FIG. 6 is a flow diagram of BS operations in the making and receiving of transmissions over time-frequency domain beams.

FIG. 6 illustrates a flow diagram of BS operations 600 in the making and receiving of transmissions over time-frequency domain beams. BS operations 600 may be indicative of operations taking place in a BS as the BS sends transmissions to or receives transmissions from MSs. BS operations 600 ensures absolute round robin fairness between beams. BS operations 600 may be in continuous operation while a communications system containing the BS is in a normal operating mode.

BS operations 600 may begin with the BS selecting a beam to assign (block 605). The BS may select beams to assign randomly or it may select beams in an ordered manner, such as by preference of MSs, reported CQI, or so forth. The information used by the BS to select beams may be previously received in transmissions from the MSs and stored for later use. The BS may then reset a counter, wherein the counter keeps track of a number of times the beam has been assigned (block 610).

For the beam selected for assigning, the BS may select a MS from the one or more MSs that has indicated a preference for the beam (block 615) and then select a best available subband for the selected MS (block 620). The best available subband may simply be a first available subband in the beam, a subband sufficiently far away from any subband already selected for the MS to allow for circuitry in the MS to retune, a subband that is the same as a subband already selected for the MS to prevent the MS from having to retune its circuitry, or so on. The BS may then reset a time slot pointer (block 625) and select a next time slot, such as one pointed to by the time slot pointer (block 630).

The BS may perform a check to determine if the time slot is free, i.e., the time slot has not been assigned a beam (block 635). If the time slot has already been assigned to a beam, the BS may return to block 630 to select another time slot. If the time slot is free, then the BS may assign the beam to the subband at the time slot, increment the counter keeping track of the number of times the beam has been assigned, and remove the subband for the MS (block 640).

The BS may then perform a check to determine if the beam has been assigned a specified number of times that the beam is to be assigned in the beam cycle (block 645). If the beam has not already been assigned the specified number of times, then the BS may return to block 615 to continue with another MS from the one or more MSs that has indicated a preference for the beam. If the beam has already been assigned the specified number of times in the beam cycle, then the beam assignment for the beam is complete.

The BS may then perform a check to determine if there are additional beams to assign (block 650). If there are additional beams to assign, then the BS may return to block 605 to select another beam for assigning. If there are no more beams to assign, the BS may actually make time-frequency resource assignments to the MSs based on the subframe-subband pair assignments and inform the scheduled MSs of their time-frequency resource assignments (block 655). Transmissions may then be made or received over the time-frequency resource assignments (block 660), and BS operations 600 may terminate.

According to an alternative embodiment, it is possible to sacrifice fairness to gain increased throughput. Recall that each MS reports SINR values for its best beam (or a specified number of the largest beams) for each subframe-subband pair within a cycle period. Therefore, once a beam is selected for allocation, the MS SINR information may be used to determine in which subframe-subband pair the MS should be scheduled. To achieve diversity gains the subframe-subband pair scheduling decision may be made as follows: For each subframe-subband pair, determine the average SINR over all UEs that have chosen the selected beam as its best; the subframe-subband pair with the largest average SINR is the one that is allocated to the selected beam (unless the pair is already taken, in which case the pair with the next largest SINR is allocated to the selected beam, and so forth). Note that the scheduling technique described provides group diversity gains. In other words, the beam is allocated to serve a group when the group is experiencing good channel conditions. The individual MS assignments are then made by the scheduler. FIG. 7 illustrates a pseudo-code representation of the time-frequency domain beam scheduling and sorting.

Figure 8:
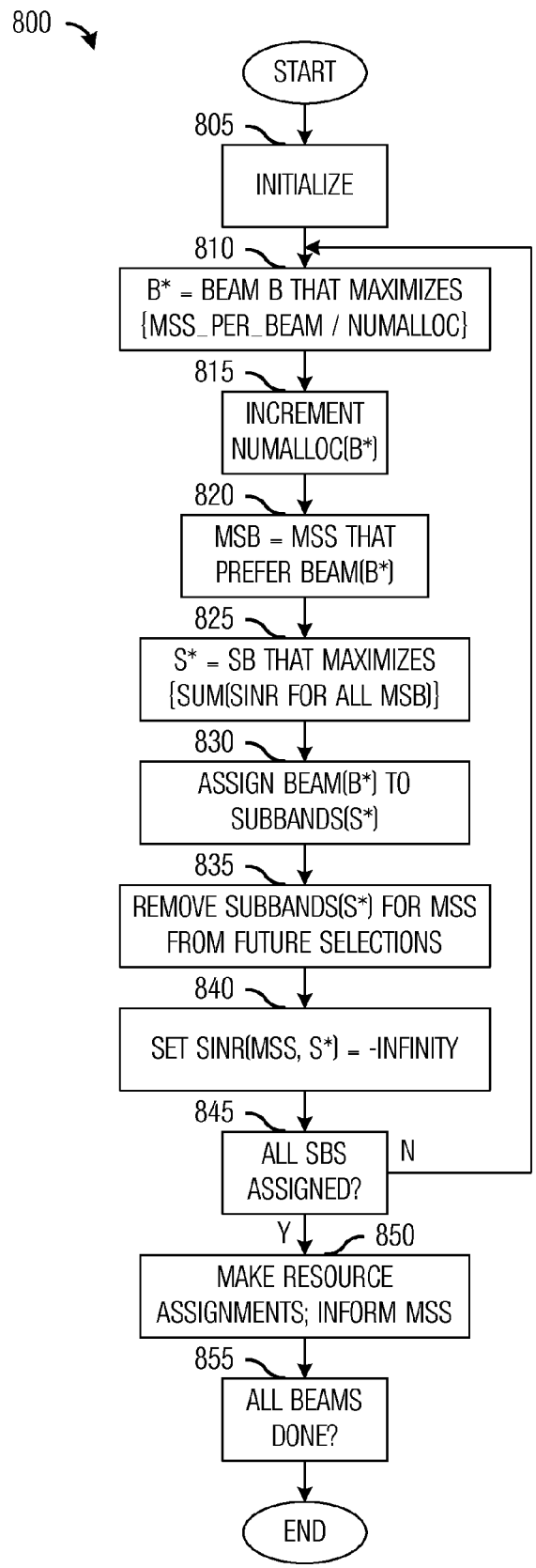
FIG. 8 is a flow diagram of BS operations in the making and receiving of transmissions over time-frequency domain beams.

FIG. 8 illustrates a flow diagram of BS operations 800 in the making and receiving of transmissions over time-frequency domain beams. BS operations 800 may be indicative of operations occurring in a BS as the BS sends or receives transmissions from MSs. BS operations 800 may be in continuous operation while a communications system containing the BS is in a normal operating mode.

BS operations 800 may begin with the scheduler performing initialization of values and variables (block 805). For example, the BS may create a list of SINR for all MSs and subbands, and so on. After initialization, the BS may determine a value of a variable b*, where b* represents a beam b that maximizes the expression MSs_per_Beam/NumAlloc, NumAlloc is the number of MSs allocated to the beam b (block 810). The BS may then increment variable NumAlloc for beam b* (block 815).

The BS may then set a variable MSS, where MSS represents the number of MSs that prefer beam b* (block 820). The BS may then find a subband s* that maximizes a sum of the SINR for all MSs that prefer beam b* (block 825). With the subband s* found, the BS may assign beam b* to subband s* (block 830) and remove subband s* from future assignment (block 835). Also, to remove subband s* from future consideration, the BS may set the SINR of subband s* to negative infinity or some other very small number (block 840).

The BS may then perform a check to determine if all subbands have been assigned (block 845). If not all subbands have been assigned, then the BS may return to block 810 to select another beam b* that maximizes the expression MSs_per_Beam/NumAlloc. If all subbands have been assigned, the BS may actually make time-frequency resource assignments to the MSs based on the subframe-subband pair assignments and inform the scheduled MSs of their time-frequency resource assignments (block 850). Transmissions may then be made or received over the time-frequency resource assignments (block 855), and BS operations 800 may terminate.

Figure 9:
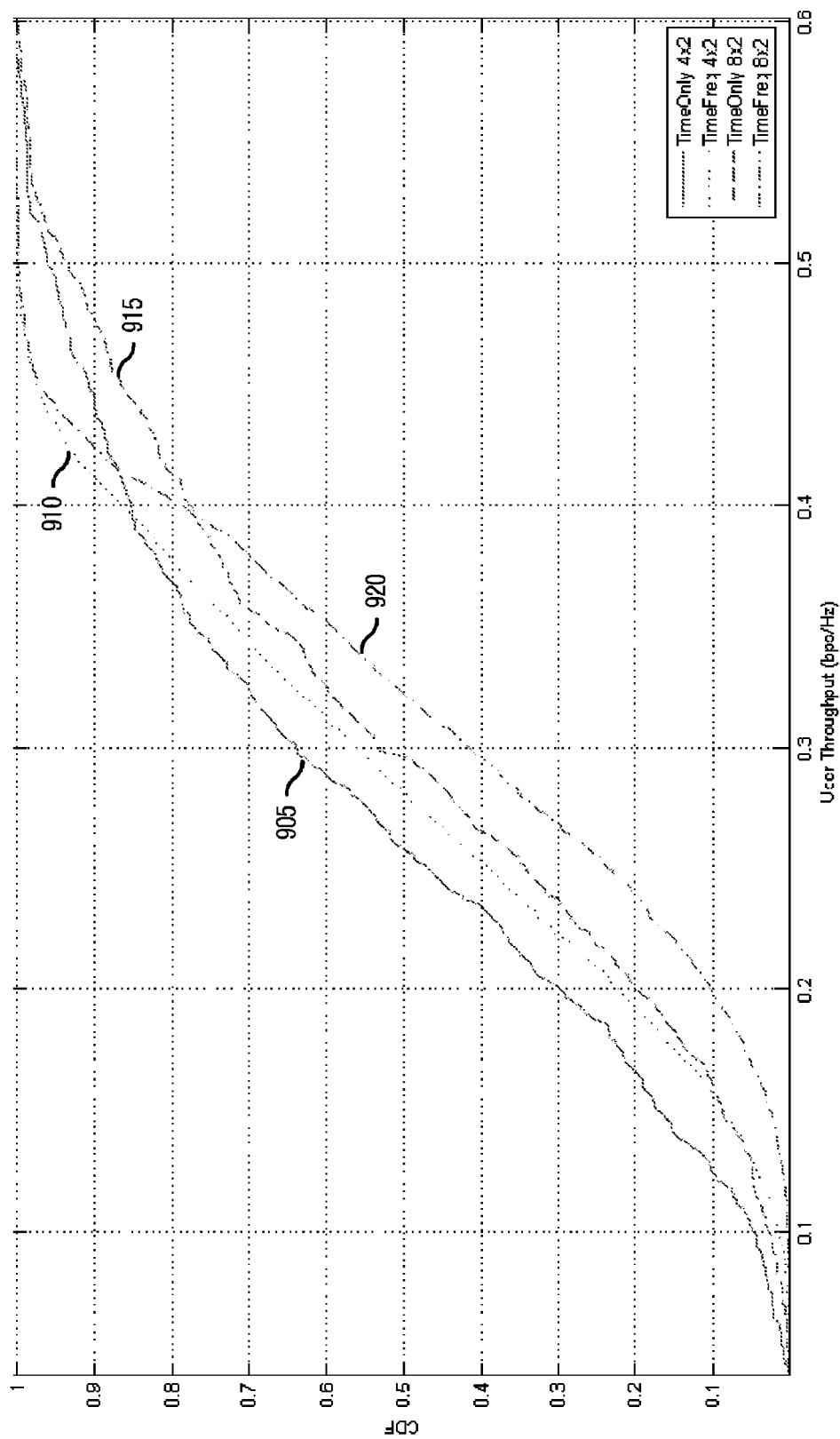
FIG. 9 is a plot of a fairness curve for a number of communications systems.

FIG. 9 illustrates a plot of a fairness curve for a number of communications systems. A first curve 905 represents a fairness curve for a 4×2 communications system with time domain cycling of network resources, a second curve 910 represents a fairness curve for a 4×2 communications system with time and frequency domain cycling of network resources, a third curve 915 represents a fairness curve for a 8×2 communications system with time domain cycling of network resources, and a fourth curve 920 represents a fairness curve of a 8×2 communications system with time and frequency domain cycling of network resources. As shown in FIG. 9, communications systems with time and frequency domain cycling of network resources provide greater fairness than communications system with time domain cycling of network resources.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting information, the method comprising:
    selecting a beam from a set of beams;
    determining a set of users out of a plurality of users, the set of users preferring the selected beam;
    for each user in the set of users, selecting a first available subframe-subband pair that maximizes the user's channel quality;

scheduling the selected subframe-subband pairs; and
transmitting information related to the scheduled subframe-subband pairs to the users in the set of users,
wherein selecting a first available subframe-subband pair comprises:
    selecting a best subband for the user;
    selecting a first subframe in the best subband;
    determining if the first subframe is free; and
    if the first subframe is free,
        assigning the first subframe to the beam, and
        removing the best subband for the user.

2. The method of claim 1, further comprising:
transmitting to the users in the set of users over the scheduled subframe-subband pairs; or
receiving from the users in the set of users over the scheduled subframe-subband pairs.

3. The method of claim 1, wherein a user's channel quality is the user's signal plus interference to noise ratio.

4. The method of claim 1, further comprising repeating the selecting a beam, the determining a set of users, and the for each user in the set of users, for each beam in the set of beams.

5. The method of claim 1, wherein selecting a first available subframe-subband pair further comprises if the first subframe is not free,
    selecting a second subframe in the best subband, and
    repeating the if the first subframe is free and the if the first subframe is not free with the second subframe.

6. The method of claim 1, further comprising receiving from each user in the plurality of users an indicator of the user's preferred beam.

7. The method of claim 6, wherein the preferred beam is a beam having a highest measure of signal quality at the user.

8. The method of claim 6, wherein the indicator indicates the user's multiple preferred beams.

9. A method for transmitting information, the method comprising:
    selecting a beam from a set of beams that maximizes a ratio of users per beam to allocated users;
    computing a measure of channel quality for each subframe-subband pair in a set of subframe-subband pairs of the selected beam for all users that prefer the selected beam;
    selecting a subframe-subband pair in the set of subframe-subband pairs with a largest measure of channel quality;
    allocating the selected subframe-subband pair to the selected beam;
    scheduling the allocated subframe-subband pairs; and
    transmitting information related to the scheduled subframe-subband pairs.

10. The method of claim 9, further comprising:
receiving information from users over the scheduled subframe-subband pairs; or
transmitting information to users over the scheduled subframe-subband pairs.

11. The method of claim 9, further comprising repeating the selecting a beam, the computing a measure of channel quality, the selecting a subframe-subband pair, and the allocating until all subbands have been allocated.

12. The method of claim 9, wherein the selecting a subframe-subband pair comprises:
    for each subband, computing a sum of the measure of channel quality for each user's measure of signal quality for the subband; and
    selecting a subband having a largest sum.

13. The method of claim 9, wherein the measure of channel quality comprises a signal plus interference to noise ratio.

14. The method of claim 9, further comprising removing the allocated subframe-subband pair from future consideration.

15. The method of claim 9, further comprising receiving from each user an indicator of the user's preferred beam.

16. A controller comprising:
    a receiver coupled to an antenna, the receiver configured to receive signals detected by the antenna;
    a transmitter coupled to the antenna, the transmitter configured to transmit signals using the antenna;
    a controller coupled to the receiver and to the transmitter, the controller configured to compute a measure of a quality of a channel between the controller and a communications device; and
    a scheduler coupled to the receiver and to the controller, the scheduler configured to select a beam out of a set of beams in accordance with preferred beam information provided by communications devices served by the controller, to select an available time-frequency resource for each communications device preferring the selected beam, and to schedule a transmission opportunity for the communications devices in accordance with the selected available time-frequency resources,
    wherein the scheduler comprises:
        a beam select unit configured to select a beam out of the set of beams in accordance with the preferred beam information; and
        a communications device select unit coupled to the beam select unit, the communications device select unit configured to select a communications device from a set of communications device expressing preference for the beam selected by the beam select unit, and
    wherein the selection of the beam out of the set of beams is made in accordance with a number of communications devices expressing preference for the beam.

17. The controller of claim 16, wherein the scheduler is further configured to select a time-frequency resource for the beam.

* * * * *